May 7, 1940.   O. SHACKELFORD   2,199,529
LEHR BELT AND METHOD OF MAKING THE SAME
Filed Oct. 20, 1936   2 Sheets-Sheet 1
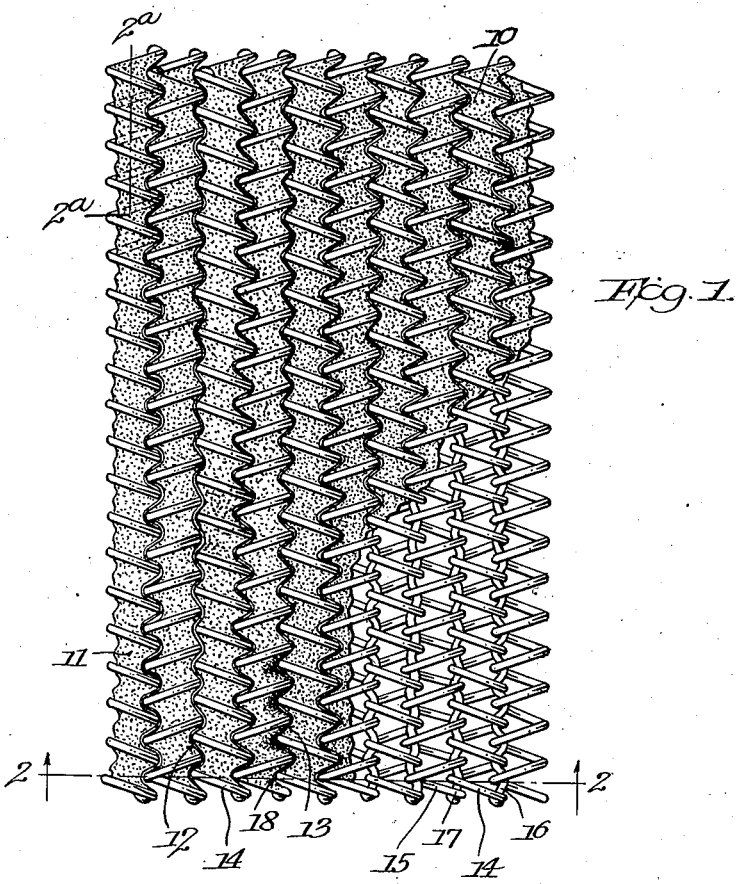
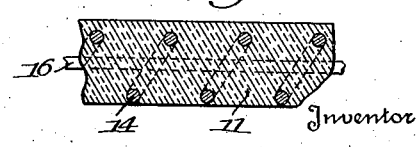
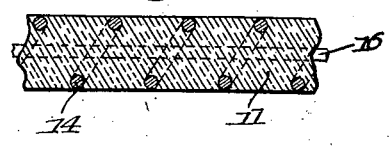
Inventor
Orie Shackelford
By Cushman, Darby & Cushman
Attorneys Patented May 7, 1940

2,199,529

UNITED STATES PATENT OFFICE 2,199,529

LEHR BELT AND METHOD OF MAKING THE SAME

Orie Shackelford, Fairmont, W. Va.

Application October 20, 1936, Serial No. 106,681

22 Claims. (Cl. 154—4)

This invention relates to a new and improved ware-carrying belt adapted for use in glass annealing lehrs, and to novel methods of making the same.

It is the primary object of the present invention to provide a lehr belt of the class described having high heat insulating properties. The advantage of such a belt is that the transfer of heat from the bottom of the supported ware to the belt is retarded. Thus, cracking and checking of the ware is prevented, as well as the setting up of undue internal strains and stresses in the bottom of the articles being annealed. Moreover, a lehr belt of high heat insulating properties improves the entire annealing operation in that it separates the dense cool air which collects below the belt from the annealing chamber proper and from the ware supported upon and above the belt. A belt of this type also will be maintained at a more nearly constant temperature, since it heats up and cools down more slowly than conventional lehr belts.

The new belt is characterized by the combination of a flexible wire mesh fabric and a mass of heat resisting and heat insulating material substantially filling the interstices of the fabric, without impairing the flexibility thereof. If desired, the insulating material may completely cover the wire mesh on one or both surfaces of the belt, preferably at least on the ware bearing surface. This construction is of considerable advantage in some cases, since it prevents the ware from coming in contact with the wire fabric of the belt.

It is a further object of the invention to provide a method of filling, and in some cases, also covering the surface of a wire mesh fabric with heat insulating material, without impairing the flexibility of the fabric.

In the accompanying drawings,

Figure 1 is a plan view of the belt;

Figure 2 is a cross-section on line 2—2 of Figure 1;

Figure 2a is a cross-section on line 2a—2a of Figure 1;

Figure 2b is a similar view of a modification in which the top of the insulating material is flush with the tops of the wire loops of the belt;

Figure 2c is a similar view of a further modification in which the insulating material covers the surface of the wire mesh;

Figure 3:
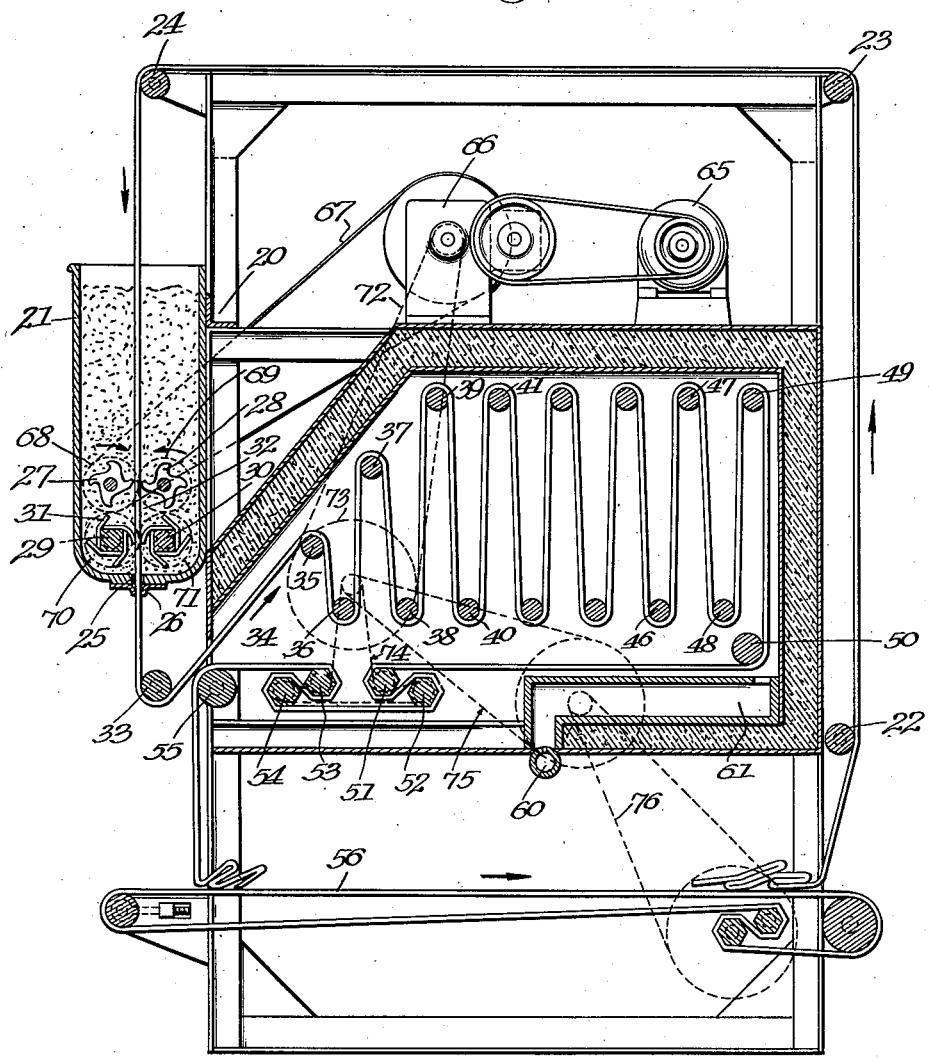
Figure 3 is a cross-section view of an apparatus which may be used for performing the method of this invention and for making the article.

Referring to Figure 1, the belt comprises a wire mesh fabric 10, which may be constructed as hereinafter described, and a plastic heat insulating filling 11, cracked along lines 12, 13 etc. so that the belt remains flexible.

Although any type of wire mesh fabric may be used, the structure shown in the drawings has been found to be particularly efficient. This fabric is made up of alternate left hand and right hand wire spirals 14, 15. Associated with each spiral 14 is a transverse, serpentine connecting strip 16, and with each spiral 15, a corresponding wire 17. The ends of the wires 16 are welded or otherwise secured to the ends of the spiral 14, and the ends of wire 17, to spiral 15. Thus, each spiral and its transverse wire constitutes a link unit extending transversely the full width of the belt. The specific structure of this belt is not a part of my invention, since such a belt is shown, for instance, in the patent to King, 1,952,873. As pointed out below, however, I do claim the use of this belt with a plastic filling material as being my invention.

The spaces between the convolutions of the spirals 14 and 15, and between those convolutions and the associated transverse wires 16, 17 are filled with a plastic heat insulating material, the composition of which may vary within wide limits, a specific example of which, however, is pointed out below.

The body of plastic material is cracked along the normal lines of flexure of the belt so that each section, comprising a spiral and a transverse wire, may pivot as a unit in the normal manner with respect to the adjacent sections. The plastic material, after it is hardened, adheres to the surfaces of the adjacent spiral and to the surfaces of the transverse wire connected to that spiral. Thus, one unit of the belt consists of not only the spiral wire and the transverse wire, but, in addition thereto, a narrow strip of heat insulating material bonded to those wires and extending transversely all the way across the belt.

A generally rounded hole 18 is formed through the body of plastic material between each convolution of the spiral 14 adjacent the wire 16, and the convolutions of the next spiral extend through these holes. Thus, one section of the belt may move with reference to the next section, by movement of the convolutions through the holes associated with the adjacent convolutions.

This desirable relation of the insulating material to the wire mesh fabric is accomplished by the method of the present invention. I first take a preformed wire mesh fabric having any desired structural characteristics, and I then apply a mass of heat insulating material thereto and substantially completely fill the interstices of the fabric with the material. The heat insulating composition may be applied by hand, by the use of a trowel, or it may be applied by rollers, or by any other appropriate means. Either before or during the hardening of the material, I flex the belt to create a plurality of cracks along the normal lines of flexure of the belt. This flexing may be accomplished by running the fabric over rollers or the like. Preferably, the flexing operation is done while the belt is being subjected to a heated atmosphere to dry, harden, and set the material.

It is entirely feasible to apply a surplus of plastic heat insulating material to one or both surfaces, to cover the wires of the belt, and in many cases, such a method is preferred, since the wires of the belt are then insulated from the ware supported thereon during the annealing operation.

A satisfactory heat insulating material has been found in the commercial product which is readily available on the market known as "Weber's special 2–4–1 insulating cement", made by Weber Insulations, Inc., East Chicago, Indiana. In the alternative, any plastic heat insulating material may be used, for instance, a composition comprising mineral wool, mineral wool and a binder, asbestos and a binder or either of the above fibrous mineral substances and pulverized soap stone and a binder. It must be understood, however, that the invention is not limited to any particular composition, as many plastic materials will be found to be satisfactory.

Figure 3 of the drawings shows a preferred apparatus for performing the method, and for making the article of the present invention.

This machine serves as an efficient means for forcing a plastic heat insulating compound in the interstices of a woven wire lehr belt. It is particularly desirable since it provides a smooth surface for the articles carried by the belts and may be adjusted to interpose a layer of heat insulating material between the metal of the belt and the ware which ultimately will be supported thereby. On one side of the machine frame 20, there is mounted a container or trough 21 for the plastic heat insulating material. The lehr belt may be led over rollers 22, 23, 24 and fed downwardly into the trough and through a slot 25 in the bottom thereof. Wipers 26 serve to prevent the escape of undue amounts of plastic material. If desired, the slot 25 at the bottom of the trough may be omitted, and the belt, in such a case, may be led upwardly out of the trough and directly over appropriate rollers to the outside.

Disposed within the trough 21, there preferably are some means for forcing the plastic material into the interstices of the belt. In some cases, simple pressure rolls or the like may be found sufficient, but I prefer to employ beaters 27, 28, driven as indicated by the associated arrows, and a second pair of beaters 29, 30, rotating in the opposite direction, and provided with flexible flaps 31. By reason of the relative directions of rotation of these members, an area of high pressure is created in the plastic material in the zone 32 between the beaters, to force the plastic material into the interstices of the belt.

After the belt has thus been filled with the plastic composition, it is led around a roller 33 and thence upwardly into an oven 34. Disposed within the oven are a plurality of idler rolls 35—49, over which the belt is led in a serpentine path. During its passage through the oven, the belt is flexed, and the plastic material cracked and at least partially hardened. Prior to its exit from the oven, the belt passes over the idler roller 50 and the driving rollers 51—54, and finally over the last idler roller 55.

The oven may be heated by an appropriate gas burner 60 serving to direct a flame into a heating chamber 61. By the arrangement disclosed, the forward, entrance end of the oven adjacent the roller 35 will be of relatively low heat, so that the material will be hardened slowly. The hottest part of the oven will be at the rear end adjacent the rollers 47, 49, where the hardening action will be substantially completed.

The belt after it has been treated, is discharged upon the conveyor 56 where it falls in folds as indicated.

After a single long belt has been filled in accordance with the present invention and in the apparatus of Figure 3, the machine should be placed in readiness for a subsequent operation on another belt unless it is desired to carry on the process continuously, and treat one belt immediately after another. In the former case, the trough should be emptied when the rear end of the belt being treated has passed therethrough. A short piece of belt is attached to this rear end, and follows it through the machine, over the various rollers, to save the necessity for rethreading the machine when a new belt is to be treated. The new belt is merely attached to the end of this short piece, and it, in turn, will follow the short piece over the various rollers and throughout the convolutions disclosed. This short piece, thus, is always left in the machine at the termination of a filling operation.

An appropriate drive for the various elements is disclosed as embodying an electric motor 65, mounted on the framework above the oven, and a speed reduction assembly 66. The latter drive the beaters 27—30 by means of a sprocket chain or belt 67 connected to an extension of one of the beater shafts. Pinions 68—71, secured to the ends of these shafts are in mesh, each with the other, on the outside of the trough, whereby rotation in the desired direction is imparted to the beaters.

The hexagonal driving rollers 51—54 for the belt are driven by a belt or chain 72, connected to a pulley or sprocket 73 disposed exteriorly of the oven. A second sprocket chain 74 is threaded around small sprockets on the ends of the roller shafts and imparts the desired rotation to these rollers. The driving rollers for the conveyor 56 are similarly connected by sprocket chains 75, 76 to the common source of power.

The apparatus described above is not claimed herein, since the present application is directed only to the novel lehr belt and the method of making the same.

It must be understood that the present invention is not limited to the details of construction shown and described in this application, but includes all articles and methods coming within the scope of the appended claims or their equivalents.

I claim:

1. A belt adapted for use in a glassware annealing lehr, comprising a metallic mesh fabric and a mass of substantially hardened, plastic heat resisting and insulating material substantially filling the interstices of said mesh and substantially permanently bonded thereto.

2. A belt adapted for use in a glassware annealing lehr, comprising a metallic mesh fabric and a mass of substantially hardened, plastic heat resisting and insulating material substantially filling the interstices of said mesh, covering said mesh on the ware bearing surface of said belt, bonded thereto, and permanently carried thereby.

3. An article of the class described comprising a flexible wire mesh fabric having the interstices thereof substantially filled with a hardened plastic material of high heat resistant and high heat insulating properties, said material being bonded to and permanently carried by said fabric.

4. A flexible mesh fabric comprising metallic sections hinged together and a hardened plastic mass of heat insulating material permanently carried by each of said sections and bonded thereto.

5. A flexible wire mesh fabric comprising metallic sections hinged together and a plurality of individual sections of hardened, plastic heat insulating material, each of said latter sections being permanently carried by and bonded to one of said metallic sections.

6. A flexible wire mesh fabric comprising spiral wire sections hinged together, and bodies of substantially hardened, plastic heat insulating material substantially filling the interstices formed by the convolutions of said spiral sections and bonded to and substantially permanently carried by said spiral sections.

7. A flexible lehr belt of high heat insulating properties comprising a plurality of spiral wire sections hinged together, and a filler of substantially non-flexible heat insulating material bonded to and permanently carried by the sections and substantially filling the spaces between the convolutions of said spirals, said filler being cracked along the lines of flexure of said sections at the hinged joints therebetween, whereby the flexibility of the belt is not impaired by the filler.

8. A lehr belt comprising a plurality of wire sections hinged together, each section comprising a wire spiral and a transverse connecting wire threaded through the spiral and having its ends connected to the ends of the spiral to form therewith a unitary section, and a mass of solidified, plastic heat insulating material substantially filling the interstices and adhesively united to the wires of each section and permanently carried thereby and movable integrally therewith upon flexing of said belt.

9. A lehr belt comprising a plurality of wire sections hinged together, adjacent sections comprising right and left-hand wire spirals and transverse connecting wires threaded therebetween, the ends of said transverse wires being rigidly connected to the ends of one adjacent spiral, whereby each of said sections comprises a spiral and a transverse connecting wire; and a body of substantially solidified, plastic heat insulating material substantially filling the interstices and bonded to the wires of each section, substantially permanently carried thereby and movable integrally therewith upon flexing of said belt.

10. As a lehr belt comprising, a wire mesh fabric comprising sections hinged together along transverse lines and a body of substantially solidified, plastic heat insulating material filling the interstices of said fabric and being cracked along transverse lines corresponding to said hinged lines, said insulating material being permanently bonded to the sections and serving to reinforce the wire fabric to resist bending along transverse lines of the belt.

11. A flexible mesh fabric comprising metallic sections hinged together and a body of heat insulating material bonded thereto and permanently carried thereby, said material comprising a substantially hardened, plastic composition including a heat insulating mineral fibre and a binder.

12. A flexible mesh fabric comprising metallic sections hinged together and a body of heat insulating material bonded thereto and permanently carried thereby, said material comprising a substantially hardened, plastic composition including mineral wool and a binder.

13. A flexible mesh fabric comprising metallic sections hinged together and a body of heat insulating material bonded thereto and permanently carried thereby, said material comprising a substantially hardened, plastic composition including asbestos and a binder.

14. A flexible mesh fabric comprising metallic sections hinged together and a body of heat insulating material bonded thereto and permanently carried thereby, said material comprising a substantially hardened, plastic composition including a heat insulating mineral fibre, pulverized soap stone, and a binder.

15. The method of making a lehr belt characterized by high heat insulating properties, which comprises the step of substantially filling the interstices of a preformed wire mesh fabric with a plastic heat insulating material and substantially permanently bonding the same thereto.

16. The method of making a lehr belt characterized by high heat insulating properties, which comprises the steps of substantially filling the interstices of a preformed flexible wire mesh fabric with a plastic heat insulating material, flexing the belt thereafter and substantially permanently bonding the material to the wire mesh.

17. The method of making a lehr belt characterized by high heat insulating properties, which comprises the steps of substantially filling the interstices of a flexible wire mesh fabric with a plastic heat insulating material, setting and hardening the plastic heat insulating material, substantially permanently bonding the same to the wire mesh, and flexing the belt during said setting and hardening, to crack said material along the normal lines of flexure of said fabric without dislodging the hardened material, thereby to maintain the flexible characteristics of the completed belt.

18. The method of making a lehr belt characterized by high heat insulating properties, which comprises the steps of substantially filling the interstices of a flexible wire mesh fabric with a plastic heat insulating material, substantially permanently bonding the same to the fabric, and cracking the material thereafter along the normal lines of flexure of the belt, without dislodging the material from said interstices.

19. The method of making a lehr belt characterized by high heat insulating properties, which comprises the steps of substantially filling the interstices of a flexible wire mesh fabric with a plastic heat insulating material, hardening the material and permanently bonding the same to the fabric, and flexing the belt during at least a portion of the hardening of the material to crack the material along the normal lines of flexure of the belt, without dislodging the material from said interstices.

20. The method of making a lehr belt characterized by high heat insulating properties, which comprises the steps of substantially filling the interstices of a flexible wire mesh fabric with a plastic heat insulating material, subjecting the material to heat to set and harden the same, substantially permanently bonding the material to the wire mesh fabric, and flexing the belt during at least a portion of the heat treatment to crack the material along the normal lines of flexure of the belt to retain the flexible characteristics of the wire mesh fabric, with the interstices thereof filled with the hardened heat insulating material.

21. The method of making a lehr belt characterized by high heat insulating properties, which comprises the steps of moving a flexible wire mesh fabric through a supply of plastic heat insulating material, forcing said material into the interstices of the wire fabric, removing the filled fabric from the supply of plastic material, hardening and setting said material and substantially permanently bonding the same to the fabric, and cracking the material prior to the completion of the hardening and setting action by flexing the wire fabric.

22. The method of making a lehr belt characterized by high heat insulating properties which comprises the steps of moving a flexible wire mesh fabric through a supply of plastic heat insulating material, forcing said material into the interstices of the wire fabric, removing the filled fabric from the supply of plastic material, moving the filled fabric into a heated zone and there hardening and setting said material and substantially permanently bonding the same to the fabric, and flexing the wire fabric in said zone, thereby cracking the plastic material along the normal lines of flexure of the wire fabric without dislodging the material from said interstices.

ORIE SHACKELFORD.